(12) United States Patent
Ali et al.

(10) Patent No.: US 10,794,398 B2
(45) Date of Patent: Oct. 6, 2020

(54) GAS TURBINE ENGINE WITH ONE PIECE ACOUSTIC TREATMENT

(71) Applicant: United Technologies Corporation, Farmington, CT (US)

(72) Inventors: Amr Ali, South Windsor, CT (US); Nigel David Sawyers-Abbott, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 516 days.

(21) Appl. No.: 14/974,220

(22) Filed: Dec. 18, 2015

(65) Prior Publication Data

US 2017/0175775 A1 Jun. 22, 2017

(51) Int. Cl.
| | |
|---|---|
| *F02C 7/047* | (2006.01) |
| *F04D 29/66* | (2006.01) |
| *F02C 7/045* | (2006.01) |
| *F01D 25/24* | (2006.01) |
| *F01D 5/02* | (2006.01) |
| *F01D 15/12* | (2006.01) |
| *F02C 3/04* | (2006.01) |
| *F02C 7/36* | (2006.01) |
| *F02K 3/06* | (2006.01) |
| *F04D 19/00* | (2006.01) |

(Continued)

(52) U.S. Cl.
CPC ............. *F04D 29/663* (2013.01); *F01D 5/02* (2013.01); *F01D 15/12* (2013.01); *F01D 25/243* (2013.01); *F02C 3/04* (2013.01); *F02C 7/045* (2013.01); *F02C 7/047* (2013.01); *F02C 7/36* (2013.01); *F02K 3/06* (2013.01); *F04D 19/002* (2013.01); *F04D 29/325* (2013.01); *F04D 29/522* (2013.01); *F05D 2220/32* (2013.01); *F05D 2230/53* (2013.01); *F05D 2250/283* (2013.01); *F05D 2260/4031* (2013.01); *F05D 2260/96* (2013.01); *F05D 2260/962* (2013.01)

(58) Field of Classification Search
CPC .......... F04D 29/663; F02C 7/047; F02C 7/36; F02K 3/06; F02K 3/068; F02K 1/827; F05D 2260/962
See application file for complete search history.

(56) References Cited

U.S. PATENT DOCUMENTS

| | | | |
|---|---|---|---|
| 5,498,127 A * | 3/1996 | Kraft | F02C 7/045 181/206 |
| 8,690,097 B1 | 4/2014 | Huynh | |
| 8,984,855 B2 | 3/2015 | Delapierre et al. | |

(Continued)

FOREIGN PATENT DOCUMENTS

WO 2014137685 A1 9/2014

OTHER PUBLICATIONS

European Search Report for European Application No. 16205173.4 dated May 4, 2017.

*Primary Examiner* — Steven M Sutherland
(74) *Attorney, Agent, or Firm* — Carlson, Gaskey & Olds, P.C.

(57) ABSTRACT

A gas turbine engine comprises a fan rotor having fan blades received within an outer nacelle, and the outer nacelle having an inner surface. The outer nacelle is secured to an inner portion through a mount flange at a first axial location. An acoustic treatment extends inwardly of the outer portion of the nacelle and across the axial location of the mount flange and further inwardly toward the fan blades.

7 Claims, 3 Drawing Sheets

(51) Int. Cl.
*F04D 29/32* (2006.01)
*F04D 29/52* (2006.01)

(56) References Cited

U.S. PATENT DOCUMENTS

| | | | |
|---|---|---|---|
| 2010/0038475 A1* | 2/2010 | Zecca | B64D 15/12 |
| | | | 244/1 N |
| 2011/0131945 A1* | 6/2011 | Vauchel | B64D 15/04 |
| | | | 60/39.093 |
| 2011/0133025 A1* | 6/2011 | Vauchel | B64D 33/02 |
| | | | 244/1 N |
| 2013/0283821 A1 | 10/2013 | Gilson et al. | |
| 2014/0064927 A1 | 3/2014 | Binks et al. | |
| 2015/0023780 A1 | 1/2015 | Costa et al. | |
| 2015/0044028 A1 | 2/2015 | Lord et al. | |

\* cited by examiner

GAS TURBINE ENGINE WITH ONE PIECE ACOUSTIC TREATMENT

BACKGROUND OF THE INVENTION

This application relates to a gas turbine engine having a noise reduction feature.

Gas turbine engines are known and typically include a fan delivering air into a bypass duct as propulsion air and into a compressor as core flow. The air is compressed in the compressor and delivered into a combustor where it is mixed with fuel and ignited. Products of this combustion pass downstream over turbine rotors, driving them to rotate.

Recently, a gear reduction has been incorporated between a fan drive turbine and the fan rotor. This has increased the design freedom for the gas turbine engine designer. In particular, the fan can now be made to rotate slower than the turbine. With this change, the diameter of the fan has increased.

It has recently been proposed to provide a gas turbine engine, where the inlet or area of a surrounding housing or nacelle forward of the fan rotor, is shorter than in the past. Providing a shorter inlet reduces the weight of the engine and also reduces external drag. Other benefits include reducing a bending moment and corresponding load on an engine structure during flight conditions such as takeoff. Further, by making the inlet shorter, the overall envelope of the engine is reduced.

However, the shorter inlets raise various challenges. In particular, noise issues are raised.

SUMMARY OF THE INVENTION

In a featured embodiment, a gas turbine engine comprises a fan rotor having fan blades received within an outer nacelle, and the outer nacelle having an inner surface. The outer nacelle is secured to an inner portion through a mount flange at a first axial location. An acoustic treatment extends inwardly of the outer portion of the nacelle and across the axial location of the mount flange and further inwardly toward the fan blades.

In another embodiment according to the previous embodiment, the acoustic treatment is continuous for 360° about a center axis of the engine.

In another embodiment according to any of the previous embodiments, a distance is defined from a plane defined by leading edges of the blades to an axial location of a forwardmost part of the nacelle. An outer diameter of the fan blades is defined, and a ratio of the distance to the outer diameter is between about 0.2 and about 0.5.

In another embodiment according to any of the previous embodiments, the outermost end of the nacelle extends outwardly for varying extents across a circumference of the nacelle, and the ratio of the distance to the outer diameter for all locations of the nacelle is between about 0.2 and about 0.45.

In another embodiment according to any of the previous embodiments, the ratio is greater than about 0.25.

In another embodiment according to any of the previous embodiments, the ratio is greater than about 0.30.

In another embodiment according to any of the previous embodiments, the ratio is less than about 0.40.

In another embodiment according to any of the previous embodiments, the acoustic treatment includes a honeycomb material.

In another embodiment according to any of the previous embodiments, a fan drive turbine driving the fan rotor through a gear reduction.

In another embodiment according to any of the previous embodiments, a gear ratio of the gear reduction is greater than about 2.3.

In another embodiment according to any of the previous embodiments, a pressure ratio across the fan drive turbine is greater than about 5.

In another embodiment according to any of the previous embodiments, the fan rotor delivers air into a bypass duct as bypass air, and into a core engine including a compressor, and a bypass ratio is defined as the volume of air being delivered into the bypass duct to the volume of air delivered into the core engine, with the bypass ratio being greater than about 6.

In another embodiment according to any of the previous embodiments, the acoustic treatment is provided with an anti-icing feature.

In another embodiment according to any of the previous embodiments, the feature includes an electric heater element.

In another embodiment according to any of the previous embodiments, the feature system includes the delivery of air to the nacelle.

In another embodiment according to any of the previous embodiments, the mount flange is an A-flange.

In another embodiment according to any of the previous embodiments, the fan rotor delivers air into a bypass duct as bypass air, and into a core engine including a compressor. A bypass ratio is defined as the volume of air being delivered into the bypass duct to the volume of air delivered into the core engine, with the bypass ratio being greater than about 6.

In another embodiment according to any of the previous embodiments, the acoustic treatment is provided with an anti-icing feature.

In another embodiment according to any of the previous embodiments, the feature includes an electric heater element.

In another embodiment according to any of the previous embodiments, the feature system includes the delivery of air to the nacelle.

These and other features may be best understood from the following drawings and specification.

DETAILED DESCRIPTION

Figure 1:
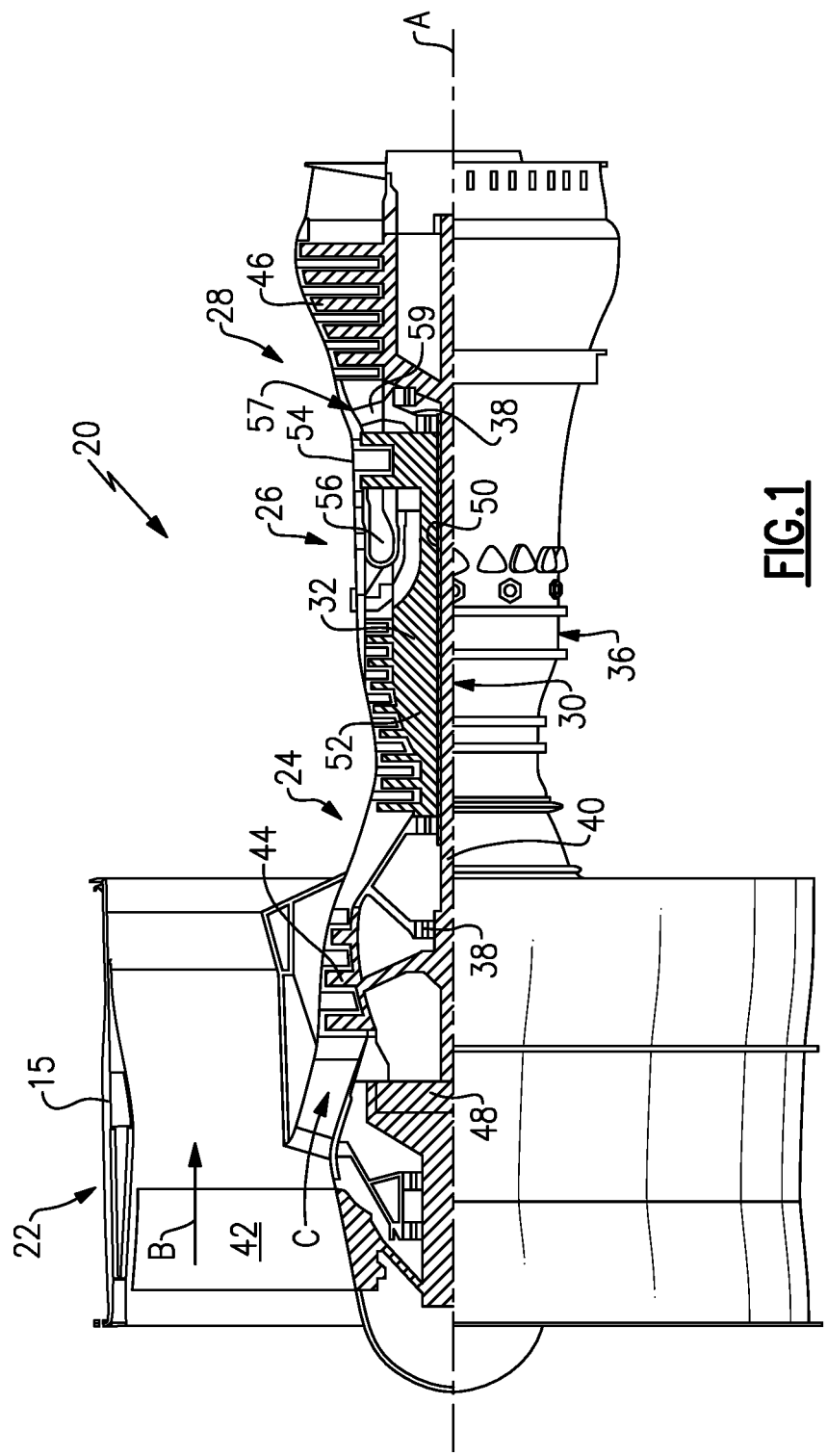
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
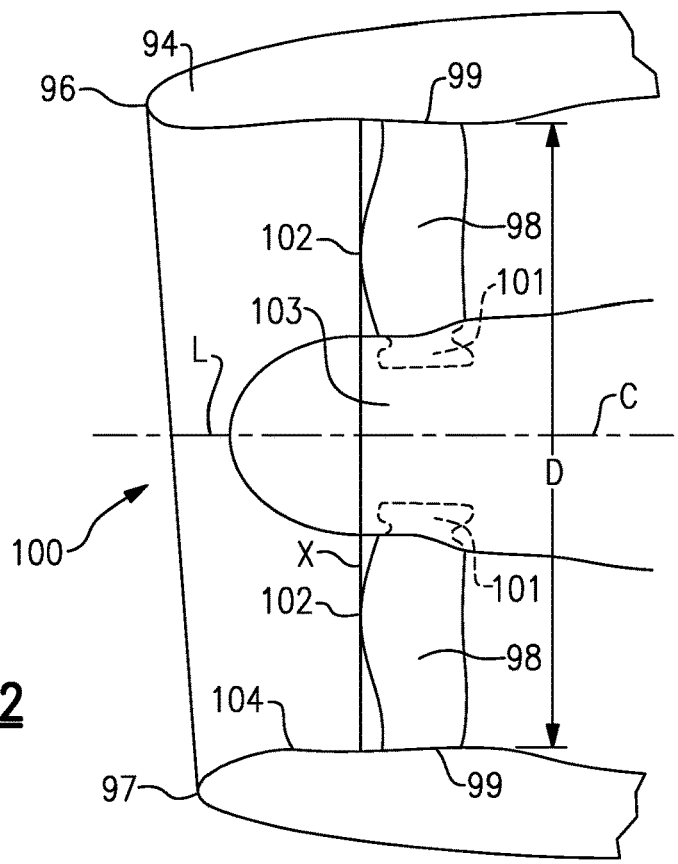
FIG. 2 shows a challenge in short inlet engines.

FIG. 2 shows an engine known as a short inlet engine. As shown, a nacelle 94 has outermost, or forwardmost ends 96 and 97. As can be seen, the forwardmost ends do not necessarily lie in a common plane perpendicular to a center axis of the engine. Rather, point 96 is further forward than point 97. Fan blades 98 have an outer diameter 99. The nacelle 94 is shown to have a radially inwardly extending innermost point, or throat 104. Point 104 is inward of the outer diameter 99 of the fan blade 98. As shown schematically, the fan blades have a root section 101 received in a hub 103 of the fan rotor.

The short inlet may be defined by a distance L measured from: (a) a plane X perpendicular to a central axis C, which plane also being tangent to a leading edge or forward most point 102 of the fan blade 98 to (b) a plane defined by the forwardmost points (including ends 96, 97) of the nacelle 94. A ratio is defined of L:D with D being the outer diameter of the fan blade 98.

In one embodiment L:D is between about 0.2 and about 0.5 or, more narrowly, about 0.45. Alternatively, the ratio may be greater than about 0.25 and in alternative embodiments greater than about 0.30. In embodiments, the ratio of L:D may be less than about 0.40.

As can be appreciated, the L:D quantity would be different if measured to the forwardmost point 96 than to the forwardmost point 97. However, in embodiments the ratio at the forwardmost point 96 would still be less than about 0.45, and the ratio at the shortest point 97 would still be greater than about 0.2. Also, the ratio can be taken as an average L taken to both points 96 and 97.

Stated another way, the forwardmost end of said nacelle extends outwardly for varying extents across the circumference of the nacelle, and the ratio of the L:D for all portions of the varying distance of the nacelle being between about 0.2 and about 0.45.

The engine of FIG. 2, wherein the ends 96 and 97 are not aligned, could be said to have droop. Such an arrangement has beneficial characteristics. However, it results in the area between point 97 and the leading edge 102 being very short. This raises challenges with regard to the reduction of noise and, also with distortion of the air approaching the fan blade 98. All of this can result in increased noise emanating from the engine.

Figure 3A:
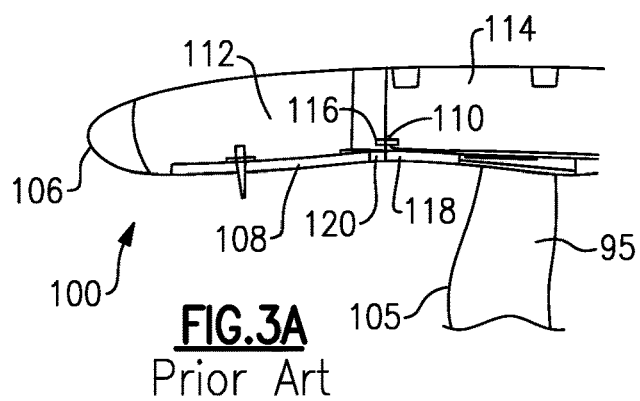
FIG. 3A shows a prior art engine.

As shown in FIG. 3A, a prior art engine 100 had a fan blade 95 with a leading edge 105. An outer end 106 of a nacelle 112 was provided with a first acoustic treatment 108. An A-flange 110 is relied upon to connect the forward portion 106 to a rearward mount portion 114 through a connector 116. In this prior art, a separate acoustic treatment 118 was positioned rearward of the A-flange 110. A gap 120 existed between the acoustic treatments 108 and 118. This has resulted in increased noise.

Figure 3B:
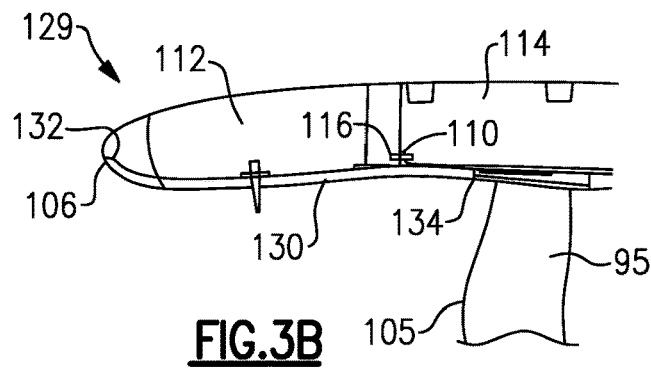
FIG. 3B shows a first embodiment.

In engines with the short inlet, as mentioned above, and, in particular, with engines having droop, this noise becomes problematic. FIG. 3B shows an engine 129, wherein the acoustic treatment 130 extends from an outer end 132 to an inner end 134 as a single unitary item. Outer end 132 extends to forward portion 106. That is, the acoustic treatment 130 spans the connection between the A-flange 110 and the nacelle 112. In this manner, the sound is deadened and reduced. This is particularly beneficial in a short inlet fan and one having droop. It is especially beneficial in an engine having a fan rotor driven through a gear reduction.

Figure 4A:
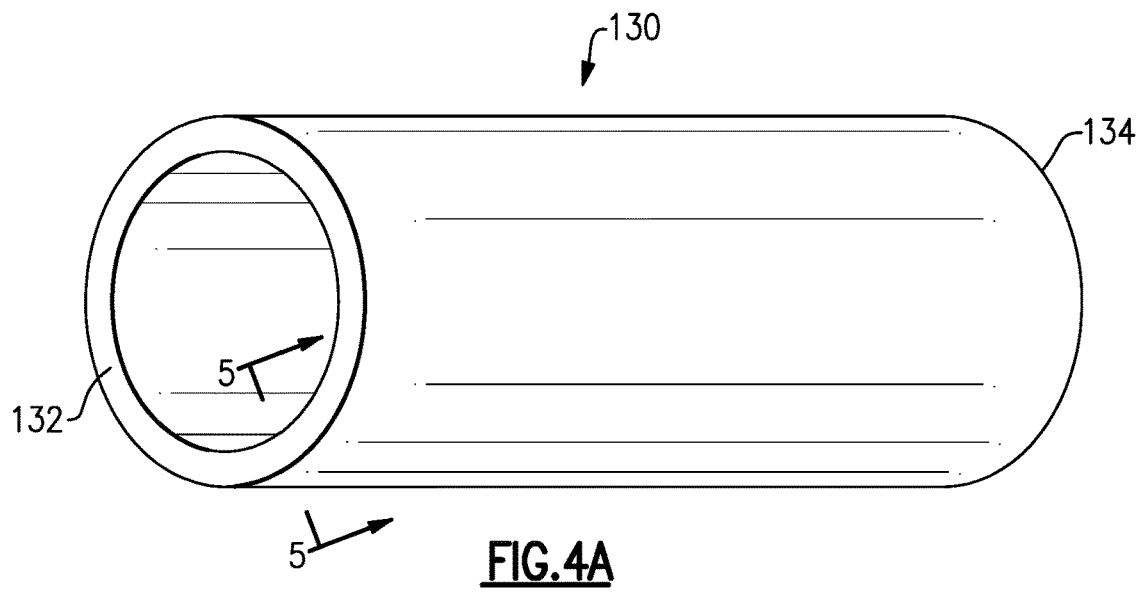
FIG. 4A shows another view of the FIG. 3B embodiment.

As shown in FIG. 4A, the acoustic treatment 130 can extend entirely around a circumference of a center axis of the engine. Of course, the actual treatment will not be cylindrical, but will have the contour required for the nacelle's shape.

Figure 4B:
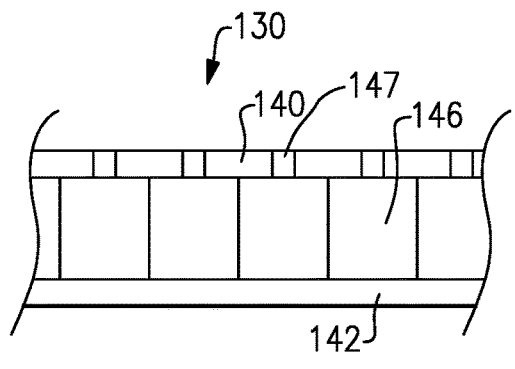
FIG. 4B is a cross-section of the FIG. 3B embodiment.

FIG. 4B shows a potential acoustic treatment composition, wherein outer layers 140 and 142 sandwich a honeycomb material 146. Layer 140 has perforations 147 which face inwardly towards the air flow. Of course, other acoustic treatments may come within the scope of this disclosure.

Figure 5A:
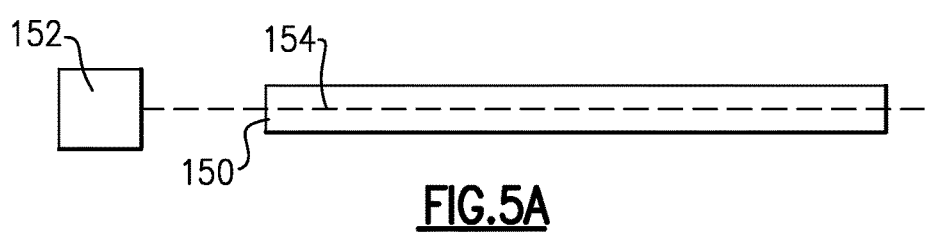
FIG. 5A is a view along line 5-5 of FIG. 4.
Figure 5B:
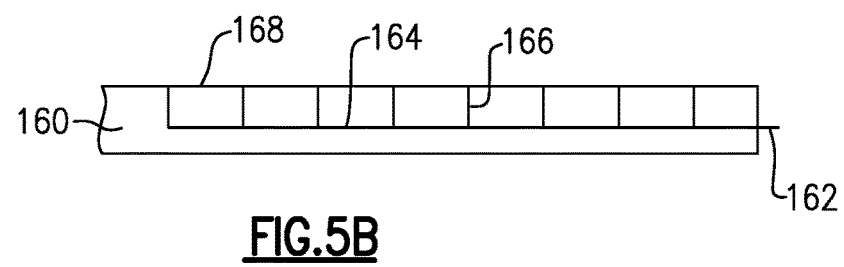
FIG. 5B shows yet another embodiment along line 5-5 of FIG. 4.

FIGS. 5A and 5B are sections along line 5-5 as shown in FIG. 4A. There are challenges with regard to the development of ice and, in particular, in short inlet engines and those having droop.

FIG. 5A shows an acoustic treatment 150 having a control 152 supplying current to a heating element 154. This will provide heating along the length of the acoustic treatment 130 to reduce the likelihood of ice accumulation.

In an alternative 160, as shown in FIG. 5B, a pipe 162 delivers air into a passage 164 in the acoustic treatment 160 and, then to a plurality of outlets 166 passing air to an inner periphery 168 of the acoustic treatment 160.

By providing a one piece acoustic treatment that incorporates anti-ice features, noise may be reduced without increasing the likelihood of ice accumulation such that the short inlet fan with droop does not raise undesirable noise issues.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan rotor having fan blades received within an outer nacelle, and said outer nacelle having an inner surface, said outer nacelle secured to an inner portion through a mount flange at a first axial location;
an acoustic treatment extending inwardly said outer nacelle and across said first axial location of the mount flange and further inwardly toward said fan blades;
wherein said acoustic treatment is continuous for 360° about a center axis of the fan rotor, said acoustic treatment is provided with an anti-icing feature;
wherein a distance is defined from a plane defined by leading edges of said fan blades to an axial location of a forwardmost part of said outer nacelle, and an outer diameter of said fan blades being defined, and a ratio of said distance to said outer diameter is between 0.2 and 0.5;
wherein said acoustic treatment includes a honeycomb material; and
wherein said anti-icing feature includes the delivery of air to said nacelle.

2. The gas turbine engine as set forth in claim 1, wherein said forwardmost part of said nacelle extends outwardly for varying extents across a circumference of said nacelle, and said ratio of said distance to the outer diameter for all locations of said nacelle being between about 0.2 and 0.45.

3. The gas turbine engine as set forth in claim 1, wherein said ratio is greater than about 0.25.

4. The gas turbine engine as set forth in claim 3, wherein said ratio is greater than 0.30.

5. The gas turbine engine as set forth in claim 1, wherein said ratio is less than 0.40.

6. The gas turbine engine as set forth in claim 1, wherein a fan drive turbine driving said fan rotor through a gear reduction.

7. The gas turbine engine as set forth in claim 1, wherein said mount flange is an A-flange.

* * * * *